April 21, 1970   E. W. WEIGMANN   3,507,465

APPARATUS FOR A RETRACTABLE JET ENGINE

Filed May 28, 1968   3 Sheets-Sheet 1

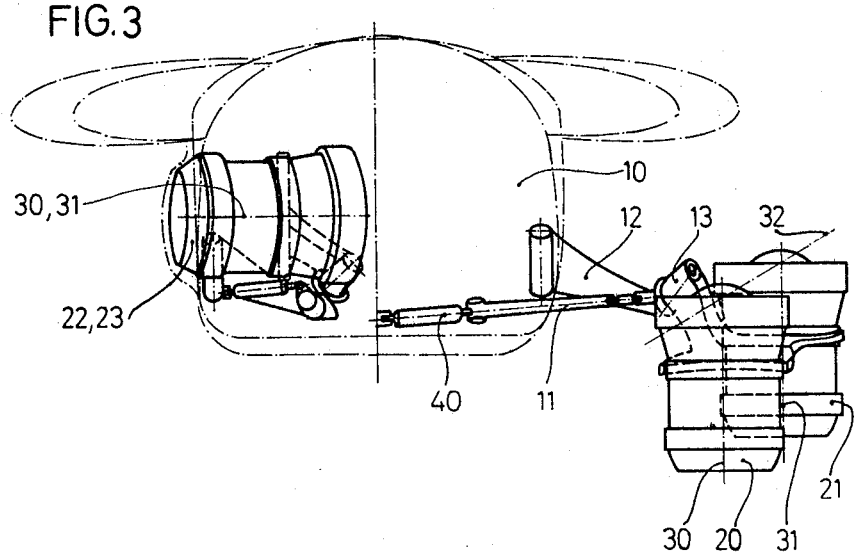
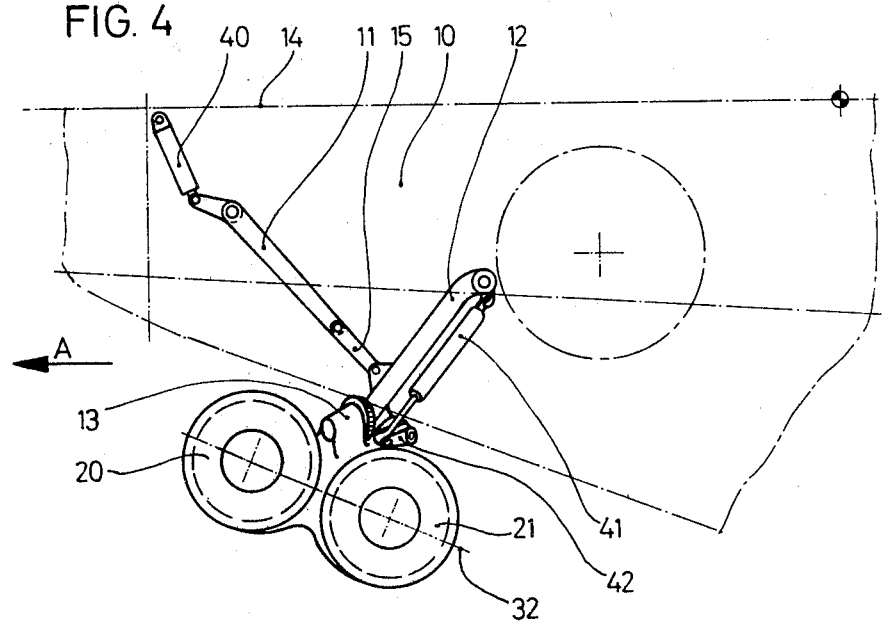

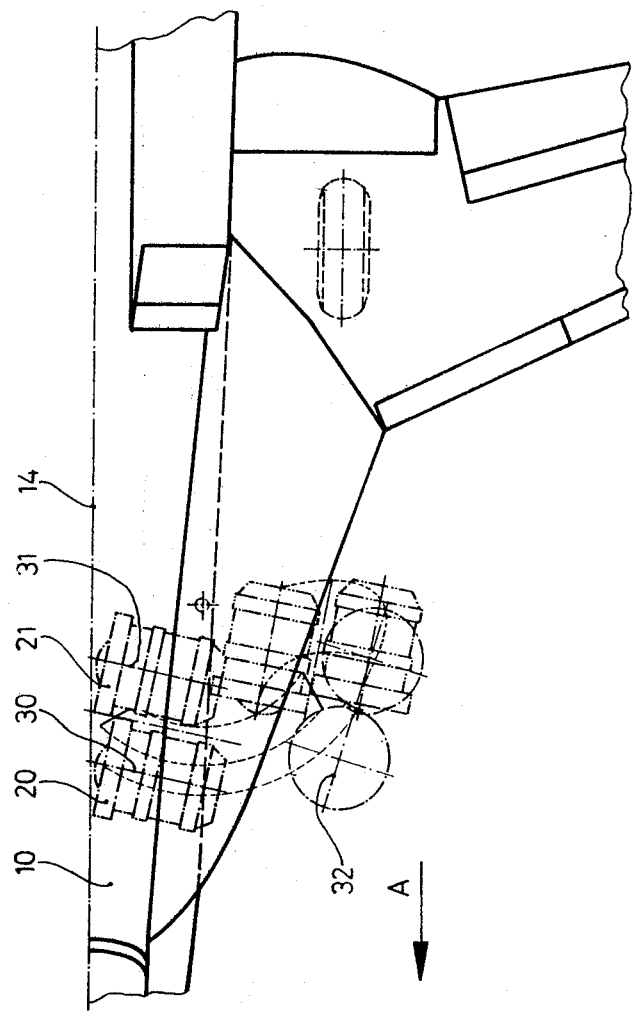

United States Patent Office 3,507,465
Patented Apr. 21, 1970

3,507,465
APPARATUS FOR A RETRACTABLE JET ENGINE
Erich W. Weigmann, Munich, Germany, assignor to
Entwicklungring Sud GmbH, Munich, Germany
Filed May 28, 1968, Ser. No. 732,708
Claims priority, application Germany, June 2, 1967
E 34,115
Int. Cl. B64c 15/14, 29/00
U.S. Cl. 244—56                                              5 Claims

ABSTRACT OF THE DISCLOSURE

The illustrated embodiment concerns an apparatus for mounting the jet engines of an aircraft from a retracted storage position within the aircraft airframe to an extended operational position adjacent the fuselage. Means are included for rotating the engines from a first position wherein the longitudinal axes of the engines are parallel to the wing axis of the aircraft to a position with the engine axes normal to the longitudinal axis of the aircraft whereat the engines are operated for the production of vertical thrust. The engines may then be shifted to an alternate position wherein their axes are parallel to the axis of the aircraft for the production of thrust during cruise flight.

BACKGROUND OF THE INVENTION

This invention generally relates to jet aircraft having multiple jet engines which are retractable into the aircraft fuselage. Such engines are selectively used as cruise or vertical lift engines when in their extended positions.

Various arrangements for retracting multiple jet engines have been described. In connection with such known arrangements, the engines when in their extended positions frequently generate "vortices" that impinge upon both the wings and the tail section of the aircraft and thus adversely affect the operation and efficiency of the aircraft.

It is an object of this invention to overcome certain disadvantages of prior constructions and to minimize the resistance of the frontal surface, that is, the surface presented to the flight direction, by an improved engine arrangement. With respect to the illustrated embodiment, the engines mounted in pairs are swung out from their stowed positions and during horizontal flight assume positions whereat their axes are parallel to each other, parallel to the aircraft centerline, and lie in a generally horizontal plane. During vertical flight, the engines are rotated so that their axes, while still remaining parallel to each other, are oriented vertically and lie in a plane approximately normal to the aircraft centerline.

The illustrated embodiment of the invention provides positive control of the centerlines of the engines resulting in tandem and offset configuration during vertical flight. This arrangement which proves especially useful for aircraft featuring a swept wing design presents the smallest frontal surface resistance and adapts the configuration of the engines to the aerodynamic flow conditions of the aircraft. In order to realize a favorable stowage arrangement in the airframe, the axes of the engines in their retracted condition, as shown in the illustrated embodiment, are positioned adjacently in a horizontal plane and form an angle of intersection of less than 90° relative to the aircraft longitudinal axis.

A main object of the invention is to provide an improved apparatus for retractable jet engines. Other objects and advantages of the invention will become apparent with reference to the following description and accompanying drawings which show an illustrative embodiment of this invention.

BRIEF DESCRIPTION OF THE DRAWINGS

FIGURE 3 is an end view of the aircraft illustrated in FIGURE 1 with one of the engine pairs extended for vertical flight and with the remaining pair of engines shown in their stowed position within the airframe.

FIGURE 4 is a partial top view of the extended engine pair illustrated in FIGURE 3 in the vertical flight position.

FIGURE 5 is a top view of the aircraft engine of FIGURE 1 illustrating, in phantom, the three selectable engine positions.

DESCRIPTION OF THE PREFERRED EMBODIMENT

Figure 1:
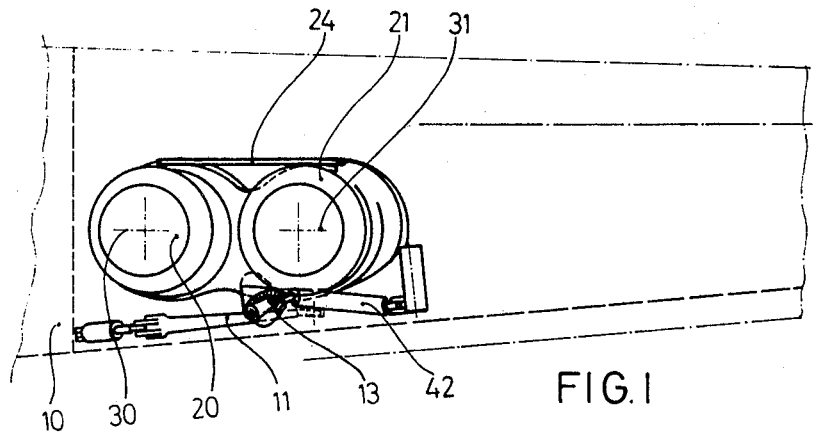
FIGURE 1 is a partial view of a jet-propelled aircraft embodying certain features of this invention illustrating a frontal view of the engines thereof in their retracted position.
Figure 2:
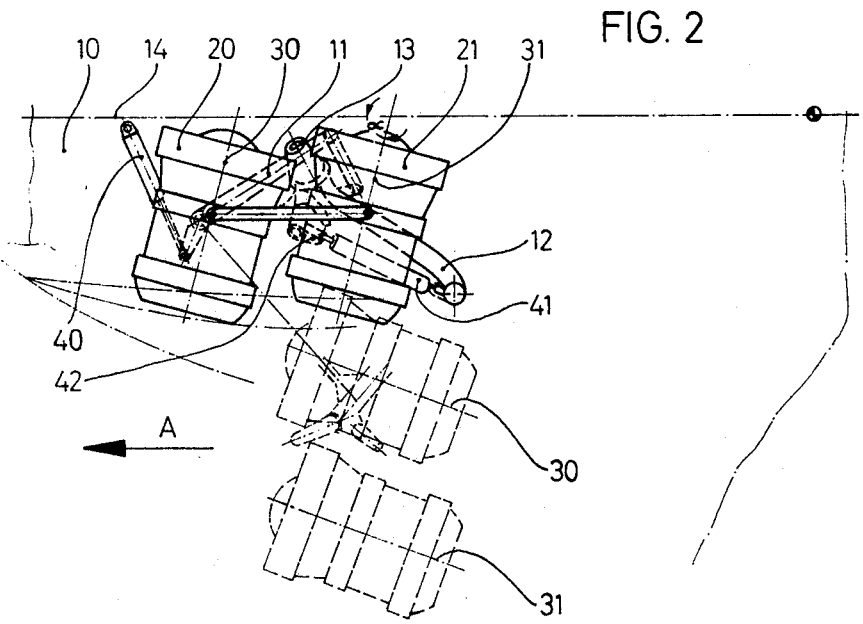
FIGURE 2 is a top view of FIGURE 1 with the position of the engines during cruise flight shown in phantom.

The illustrated aircraft includes engines, 20, 21 and 22, 23 arranged in pairs which can be extended from and retracted into an aircraft fuselage 10 by means of an actuating means and a swiveling arm 11. By means of a turning mechanism 13, the engine pairs 20, 21 and 22, 23 are rotated between horizontal and vertical flight positions. The engines are particularly arranged to eliminate the occurrence of undesirable situations; such as, the generation of "vortices" which adversely affects both the wings and the tail section when the engines are operated in their extended positions. Further, to assure a configuration which presents the smallest frontal surface resistance, the engines 20, 21 and 22, 23 are interconnected by a coupling member or other suitable means. Engine axes 30 and 31, as viewed along the flight direction A of FIGURE 5, are located in a generally level plane in a side-by-side configuration when in the cruise flight position. In this manner, the axes 30 and 31 are perpendicular to a centerline 32. During vertical flight, the engines 20, 21 and/or 22, 23 are extended and rotated so that the axes 30 and 31 are preferably perpendicular to the centerline 32. In this position, the engines 20, 21 or 22, 23 are positioned vertically in tandem configuration. During the extension/rotation cycle, the path defined by the movement of the engines follows a conical surface.

In certain applications, it may prove advantageous if the axes 30 and 31 of the engines 20, 21 or 22, 23 are offset in tandem configuration for vertical flight position so as to improve aerodynamic flow and reduce drag. In such a situation, the centerline 32 of the engine is not parellel to the aircraft centerline, but forms an acute angle therewith. In their retracted positions, the engines 20, 21 and 22, 23 when viewed along the flight direction A are in tandem configuration in a horizontal plane with the axes 30 and 31 inclined relative to the aircraft centerline 14. Such an angular position assures a favorable relationship between the engine operation position and the location of the aircraft's center of gravity.

To facilitate the swiveling operation, an operating mechanism is required on each side of the aircraft. The operating mechanism consists of a bellcrank and lever 11, a connecting rod 15, and a swivel arm 12 operated by an actuator. The operating mechanism further includes a turning mechanism operated by an actuator 41 via a lever 42. Actuators 40 and 41 may be operated jointly or independently.

Although but one specific embodiment of this invention has been herein shown and described, it should be understood that certain details of the construction shown may be altered without departing from the spirit and scope of this invention.

What is claimed is:

1. An apparatus for use with an aircraft having multiple jet engines located at the sides of the fuselage and mounted in pairs and wherein said engines are selectively usable as cruise or lift engines, a positioning apparatus comprising a first means for positioning at least one pair of said engines from a first position within the fuselage of said aircraft to a second position exterior thereof, a second means serving to rotate said engines from said second position to a third position to facilitate vertical flight and a third means for moving said engines when in said third position to a tandem offset configuration so as to improve aerodynamic flow about said engines.

2. An apparatus in accordance with claim 1 wherein said first means comprises a first actuator coupled to a link mechanism, said actuator imparting movement to said link mechanism so as to cause movement of said engines between said first and second positions.

3. An apparatus in accordance with claim 2 wherein said third means comprises a second actuator coupled to a link mechanism, said actuator imparting movement to said link mechanism so as to facilitate selective positioning of said engines in tandem offset configuration when in said third position.

4. An apparatus in accordance with claim 3 wherein said second means includes a motor and suitable gearing.

5. An apparatus in accordance with claim 3 which further includes means for jointly actuating said first and second actuators.

References Cited

UNITED STATES PATENTS

| | | | |
|---|---|---|---|
| 3,363,860 | 1/1968 | Maquire | 244—54 |
| 3,383,075 | 5/1968 | Chichester-Miles | 244—12 |

MILTON BUCHLER, Primary Examiner

J. E. PITTENGER, Assistant Examiner